Jan. 6, 1953  R. A. GOEPFRICH  2,624,426
AUTOMATIC ADJUSTING DEVICE
Filed March 22, 1947  3 Sheets-Sheet 1

INVENTOR
RUDOLPH A. GOEPFRICH
BY
ATTORNEY

Jan. 6, 1953  R. A. GOEPFRICH  2,624,426
AUTOMATIC ADJUSTING DEVICE
Filed March 22, 1947  3 Sheets-Sheet 2
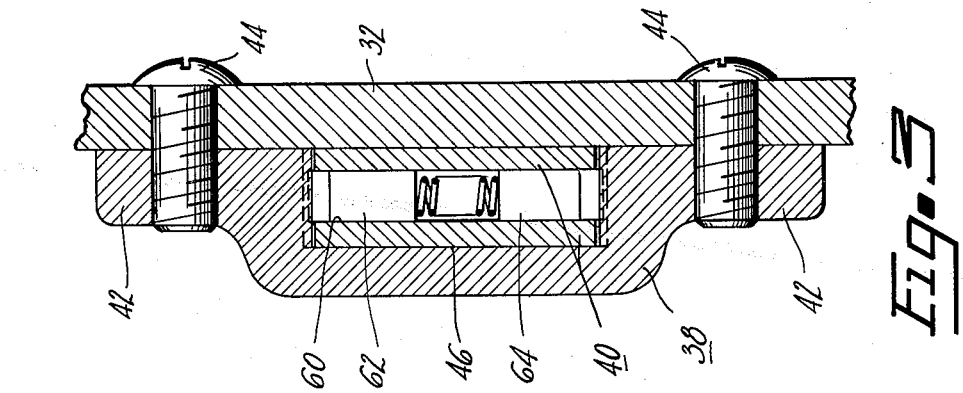
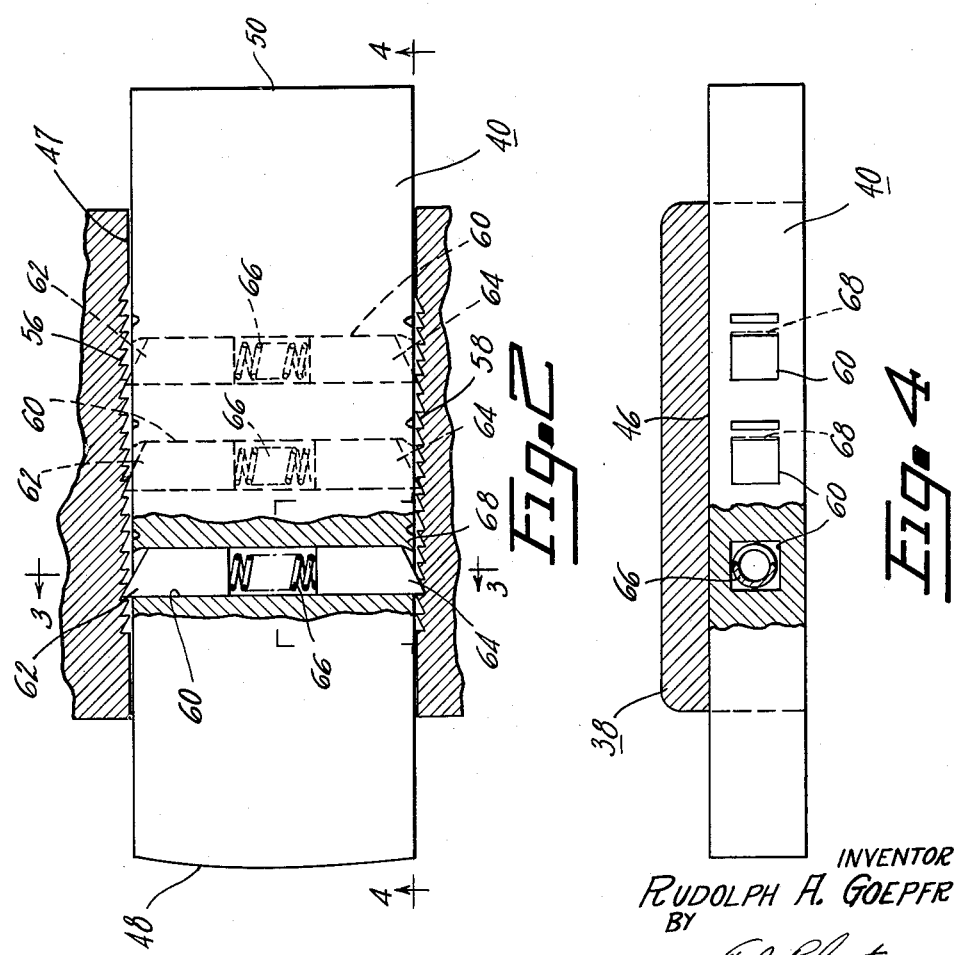
INVENTOR
RUDOLPH A. GOEPFRICH
BY
T. J. Plante
ATTORNEY Jan. 6, 1953   R. A. GOEPFRICH   2,624,426
AUTOMATIC ADJUSTING DEVICE
Filed March 22, 1947   3 Sheets-Sheet 3
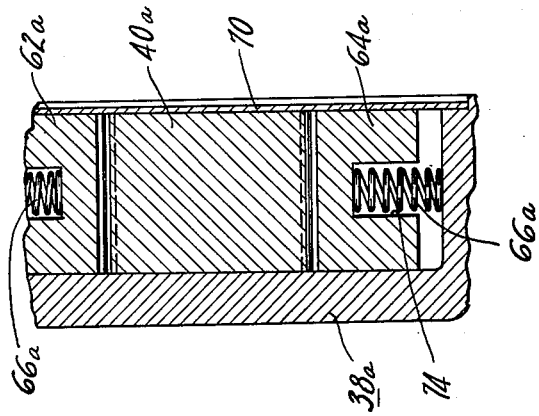
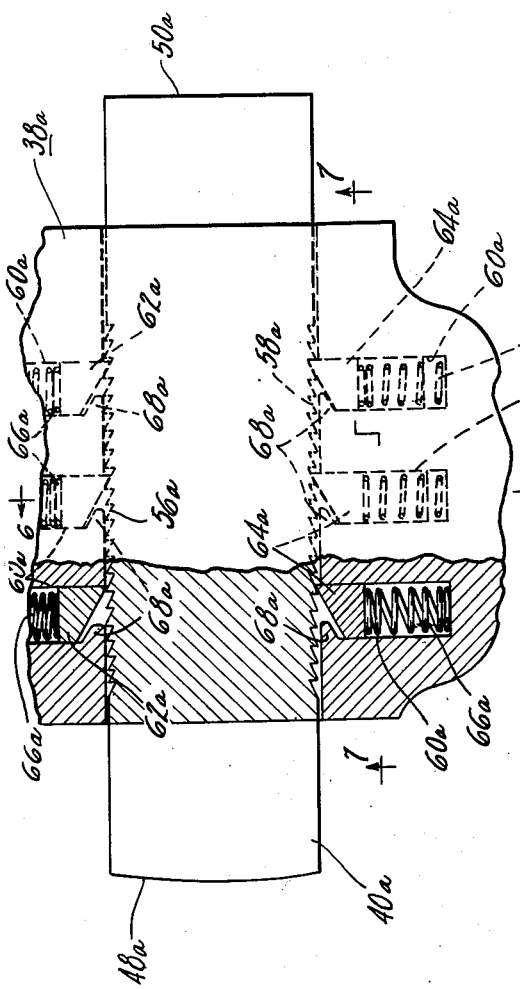
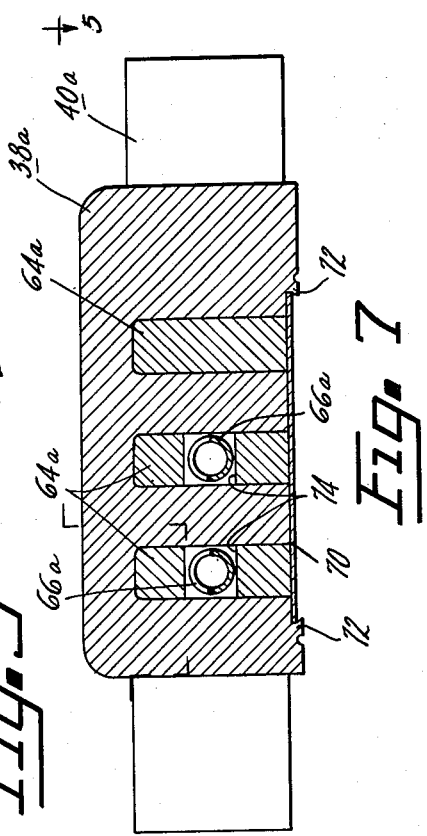
INVENTOR.
RUDOLPH A. GOEPFRICH
BY
T. J. Plante

Patented Jan. 6, 1953

2,624,426

UNITED STATES PATENT OFFICE 2,624,426

AUTOMATIC ADJUSTING DEVICE

Rudolph A. Goepfrich, South Bend, Ind., assignor to Bendix Aviation Corporation, South Bend, Ind., a corporation of Delaware Application March 22, 1947, Serial No. 736,484

3 Claims. (Cl. 188—79.5)

This invention relates to an improved automatic adjusting device, which is to be used in conjunction with a brake shoe for the purpose of maintaining a substantially constant released position clearance between said shoe and the cooperating brake drum.

In Patent No. 2,168,646, which issued August 8, 1939, I disclosed and claimed an automatic adjusting device in which a plurality of spring-pressed pawls, carried by a brake shoe, were arranged to cooperate with a radially movable plunger having a ratchet-toothed surface thereon and having its outer end flush with the outer face of the brake shoe lining.

The primary object of the present invention is to provide an automatic adjusting device similar to the one disclosed in Patent No. 2,168,646, but easier to assemble and retain assembled, simpler in construction, easier to contain in a given space, and more positive in operation than the device of the patent.

Other objects and advantages of the present invention will become apparent during the following discussion, reference being had therein to the accompanying drawings, in which:

Figure 2 is an enlarged sectional view of the operating parts of the automatic adjusting device of Figure 1;

Figure 1:
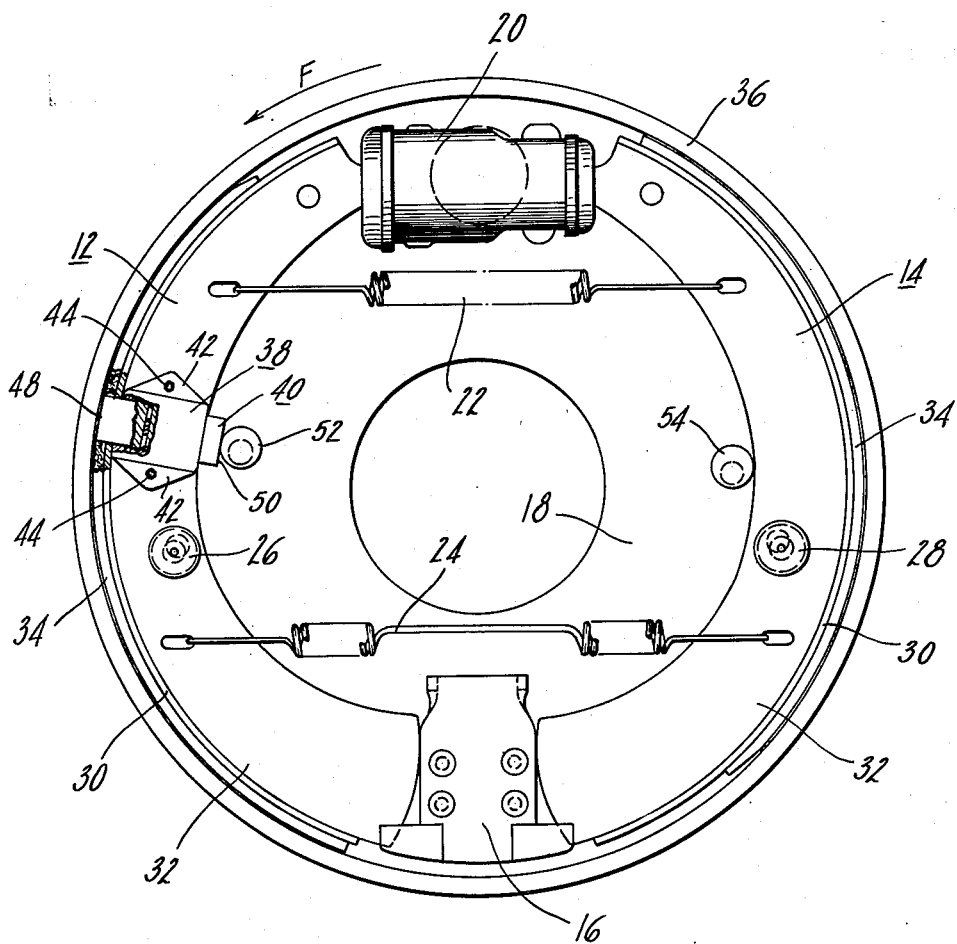
Figure 1 is a side elevation of a brake assembly which incorporates one form of my improved automatic adjusting device.

Figures 3 and 4 are cross-sectional views of the automatic adjusting device, taken on the lines 3—3 and 4—4, respectively, of Figure 2;

Figure 5 is an enlarged sectional view of the operating parts of a different, and preferred, embodiment of the invention; and Figures 6 and 7 are cross-sectional views of the preferred embodiment of the invention, taken on the lines 6—6 and 7—7, respectively, of Fig. 5.

The improved automatic adjusting device is illustrated as incorporated in a brake of the "non-servo" type, although it is applicable to any conventional brake construction. The illustrated brake includes the usual primary and secondary shoes 12 and 14, which are anchored at their lower ends against a member 16 rigidly secured to the backing plate 18, and which are adapted to be spread at their upper ends by means of a hydraulic wheel cylinder 20 carried by the backing plate. Return springs 22 and 24 are provided for urging the shoes to released position, and hold-down devices 26 and 28 may be used to retain the shoes in the proper position laterally. Each of the brake shoes 12 and 14 has the usual rim 30, strengthening web 32, and lining 34 carried by the rim and composed of suitable friction lining material.

As successive stops are made by bringing the brake shoes into engagement with the rotatable brake drum 36, the linings 34 are gradually worn down, reducing their thickness, and increasing the released position clearance between the outer face of the lining and the drum, unless suitable means are provided for preventing an excessive increase in said clearance. Normally the shoes require manual adjustment to compensate for wear, but the device disclosed herein causes the adjustment to be made automatically, without attention from the driver of the vehicle on which the brake is used.

Referring first to the embodiment shown in Figures 1 to 4, the improved automatic adjusting device is a unit which is adapted to be secured to the brake shoe, and which consists of two primary elements—a housing member 38 and a plunger member 40. The housing member 38 has ears 42 at opposite ends thereof which are adapted to be secured by suitable fastening members 44 to the web 32 of the respective brake shoe. It will be noted that, in the illustrated brake, only one automatic adjusting device is shown, and that device is mounted on the primary brake shoe 12. This has been done because the relative rates of wear of the two shoes are so disparate as to make automatic adjusting of the secondary shoe relatively unimportant. In other words, the primary shoe wears so much faster than the secondary shoe that it is likely to be substantially worn out by the time the secondary shoe requires a manual adjustment. The reason for this lies in the unequal amounts of work performed by the two shoes, due to the fact that the primary shoe 12 is the self-energizing shoe of the brake whenever the brake is applied with the vehicle moving in a forward direction, the arrow F being used in the drawing to indicate the direction of rotation of the drum 36 during forward movement of the vehicle.

The center portion 46 of the housing 38 is raised, as shown, and a radially extending opening 47 is provided between said center portion and the web of the brake shoe. The plunger member 40 extends through the opening 47 and also through openings provided in the rim 30 and the lining 34 of the shoe. The outer curved surface 48 of the plunger member is either flush with the outer face of lining 34, or (between adjustments) projecting slightly beyond the outer face of the lining, so that it engages the brake drum 36 whenever the face of the lining engages the brake drum. The inner end 50 of plunger member 40 extends inwardly beyond the edge of the shoe web and is arranged to engage a stop member 52, which is carried by the supporting member, or backing plate, 18. The stop member 52 is preferably formed as an eccentric adjusting member which can be manually operated to provide an initial, or factory, adjustment for the brake shoe. A similar eccentric adjustor 54 is located at the opposite side of the brake and engages secondary shoe 14.

The opposite sides of the opening 47 in housing 38 are provided with ratchet-toothed surfaces 56 and 58. The plunger member 40 has a plurality (preferably 3) of laterally-extending slots 60. Located in each of the laterally-extending slots 60 are two pawls 62 and 64, the pawls 62 of the several slots engaging the ratchet-toothed surface 56, and the pawls 64 of the several slots engaging the ratchet-toothed surface 58. The pawls of each pair are urged into engagement with the opposed ratchet-toothed surfaces by means of a light compression spring 66 mounted between the opposed pawls. In order to retain the pawls in assembled position in plunger member 40, in case the latter should be disengaged from housing member 38, the ends of the slots 60 are reduced in size by forming a nib 68 at each end of each slot after the springs and pawls have been assembled.

The arrangement of the pawls 62 and 64, and of the ratchet-toothed surfaces 56 and 58, is such that relative movement of the shoe 12 and plunger member 40 can occur in one direction only. Thus, the shoe can move radially outwardly with respect to the plunger member, but it is prevented from moving radially inwardly with respect to the plunger member.

In operation, as the lining 34 wears away, plunger member 40, due to its engagement with the brake drum, will be forced inwardly with respect to the shoe. Or, more correctly, during application of the brake, the plunger will remain stationary, while the shoe, as the lining wears, will move outwardly with respect to the plunger. As successive teeth on ratchet-toothed surfaces 56 and 58 are engaged by the pawls 62 and 64, the plunger member 40 will be retained in its adjusted position with respect to the shoe. In other words, the shoe will gradually move radially outwardly with respect to the plunger. When the brakes are released, assuming that an adjustment has been made during application, the plunger member 40 will prevent the shoe from returning as far inwardly as its previous released position. The released position clearance between the outer face of the brake lining and the inner face of the brake drum will remain substantially constant and will be equal to the distance during brake application between the inner end 50 of the plunger member and the engaging surface of stop member 52.

The increment of adjustment, i. e. the length of relative movement between the plunger member and shoe before the next pawl clears the next tooth, may be as small as the pitch of a single tooth divided by the total number of pawls. In this case, since six pawls are shown, if we assume that the pitch of a single tooth is .042 inch, then the increment of adjustment can be as low as .007 inch because there are six pawls. In order to obtain the smallest possible increment of adjustment, two things are necessary. First of all, the ratchet-toothed surface 56 must be radially offset with respect to the ratchet-toothed surface 58 by an amount which is equal to, or a multiple of, the increment of adjustment. Furthermore, any corresponding points on successive pawls (such as the tips of the pawls) should be spaced apart a distance which differs from a multiple of the pitch of a single tooth by an amount equal to, or a multiple of, the increment of adjustment.

The illustrated form of the device obtains the maximum number of adjustments, i. e. has a minimum increment of adjustment, because the foregoing principles are employed. Referring to Figure 2, it will be noted that the lower left hand pawl has just cleared the tooth on ratchet-toothed surface 58. As the lining wears, the upper right hand pawl will be next to clear a tooth on ratchet-toothed surface 56, and will drop into the adjacent indentation. Following that, the lower right hand pawl will clear a tooth on ratchet-toothed surface 58 and the upper center pawl, the lower center pawl, the upper left hand pawl, and the lower left hand pawl will clear their respective engaging teeth in the order listed, thus completing a cycle of operation of the automatic adjustment, and providing a total adjustment equivalent to the pitch of one ratchet tooth. This operation will, of course, continue until the lining is ready to be replaced.

The preferred form of the invention is shown in Figures 5 to 7. In applying numerals to these figures, the letter "a" has been added to the numbers used in Figures 1 to 4 to designate similar elements. Where new elements are indicated, new numerals are used.

The automatic adjustment of Figures 5 to 7 operates on the same principle as that illustrated in Figures 1 to 4. However, the six pawls 62a and 64a are carried in slots 60a provided in the housing member 38a, and the ratchet-toothed surfaces 56a and 58a are provided on opposite sides of plunger member 40a. In order to retain plunger member 40a in assembled relation with housing member 38a, even when said members are removed from the brake shoe, a closure plate 70 is secured to the underside of the housing member by means of a plurality of swaged nibs 72 (see Figure 7). The plate 70 retains both the plunger 40a and the pawls 62a and 64a in assembled position inside the housing member.

Each of the pawls 62a and 64a is recessed, as shown at 74, to receive a light compression spring 66a, which urges the respective pawl into engagement with one of the ratchet-toothed surfaces provided on the plunger member. In order to retain the pawls in their slots 60a when the plunger member is removed from the opening in the housing member, the ends of the slots 60a are reduced in size by projections 68a formed as integral parts of the housing member. The pawls and springs are assembled by inserting them in their slots through the bottom of the housing member before the closure plate 70 is placed in position.

As in the case of the automatic adjusting device of Figures 1 to 4, the device of Figures 5 to 7 is arranged to obtain the maximum number of adjustments, or the minimum increment of adjustment, taking into account the pitch of the teeth and the number of pawls. The ratchet-toothed surface 56a is radially offset with respect to the ratchet-toothed surface 58a by an amount which is equal to, or a multiple of, the increment of adjustment. And, also, corresponding points on successive pawls are spaced apart a distance which differs from a multiple of the pitch of a single tooth by an amount equal to, or a multiple of, the increment of adjustment.

Although certain particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. For use in a brake having a rotatable brake drum, a non-rotatable supporting member, and a brake shoe carried by the supporting member and adapted to at times frictionally engage the drum, said brake shoe having a friction material lining which is adjacent the drum and which is gradually worn down as a result of successive frictional engagements with the drum; an automatic adjusting device for maintaining a substantially constant clearance between drum and lining in released position comprising a unitary housing member secured to the shoe and having a radially extending opening therethrough, said housing member having six separately located laterally extending slots therein, three of which are located at each side of the radially extending opening, a plunger member extending through said opening and through the shoe and shoe lining to bring its outer end substantially flush with the face of the lining, the other end of the plunger member being arranged to engage the supporting member and thereby determine the released position of the shoe, said plunger member having ratchet-toothed surfaces formed on opposite sides thereof, the teeth of one surface being slightly offset radially with respect to the teeth of the other surface, six U-shaped pawl members, each of which is carried in one of the slots in the housing member, said pawl members being arranged to cooperate with the ratchet-toothed surfaces of the plunger member to permit the shoe to move radially outwardly with respect to the plunger member but prevent the shoe from moving radially inwardly with respect to the plunger member, corresponding points on the radially spaced pawls being spaced apart a distance which differs slightly from a multiple of the pitch of a single tooth, each of the said six pawls thus being arranged to drop successively into the next teeth on the ratchet-toothed surfaces as the relative movement of shoe and plunger member takes place, and six springs, each located in one of the slots in the housing member and bearing against a recessed portion of said pawl to urge the respective pawl into engagement with one of the ratchet-toothed surfaces of the plunger member, the inner edges of the slots in the housing member being partially closed to positively retain the pawls in assembly.

2. For use in a brake having a rotatable brake drum, a non-rotatable supporting member, and a brake shoe carried by the supporting member and adapted to at times frictionally engage the drum, said brake shoe having a friction material lining which is adjacent the drum and which is gradually worn down as a result of successive frictional engagements with the drum; an automatic adjusting device for maintaining a substantially constant clearance between drum and lining in released position comprising a single piece housing member secured to the shoe and having a radially extending opening therethrough, said housing member having a plurality of laterally extending individual slots therein arranged in radially-spaced pairs, the two slots at each pair being located at opposite sides of the radially extending opening, a plunger member extending through said opening and through the shoe and shoe lining to bring its outer end substantially flush with the face of the lining, the other end of the plunger member being arranged to engage the supporting member and thereby determine the released position of the shoe, said plunger member having ratchet-toothed surfaces formed on opposite sides thereof, the teeth of one surface being slightly offset radially with respect to the teeth of the other surface, a plurality of U-shaped pawl members, each of which is carried in one of the slots in the housing member, said pawl members being arranged to cooperate with the ratchet-toothed surfaces of the plunger member to permit the shoe to move radially outwardly with respect to the plunger member but prevent the shoe from moving radially inwardly with respect to the plunger member, corresponding points on the radially spaced pawls being spaced apart a distance which differs slightly from a multiple of the pitch of a single tooth, the several pawls thus being arranged to drop successively into the next teeth on the ratchet-toothed surfaces as the relative movement of shoe and plunger member takes place, and a plurality of springs, each located in one of the slots in the housing member and bearing against the mid portion of said pawl to urge the respective pawl into engagement with one of the ratchet-toothed surfaces of the plunger member, the inner edges of the slots in the housing member being partially closed to positively retain the pawls in assembly.

3. For use in conjunction with a brake shoe, an automatic adjusting device comprising a housing member secured to the shoe and having a radially extending opening therethrough, a plunger member extending through said opening and through the shoe with its outer end substantially flush with the face of the shoe, the other end of the plunger member being arranged to engage a stop member and thereby determine the released position of the shoe, one of said members having a plurality of laterally extending slots therein, the other of said members having two oppositely-facing ratchet-toothed surfaces, a plurality of U shaped pawl members arranged in oppositely-facing pairs, each of said pawl members being individually carried in one of the aforementioned slots, said pawl members being arranged to cooperate with the ratchet-toothed surfaces to permit the shoe to move radially outwardly with respect to the plunger member but prevent the shoe from moving radially inwardly with respect to the plunger member, the teeth of one of said ratchet-toothed surfaces being offset radially with respect to the teeth of the other ratchet-toothed surface by an amount equal to a fraction of the pitch of a single tooth, said fraction having a denominator equal to the total number of pawl members, corresponding points on the radially spaced pawls being spaced apart a distance which differs from a multiple of the pitch of a single tooth by a fraction of said pitch, said fraction having a denominator equal to the total number of pawl members, the several pawls thus being arranged to drop successively into the next teeth on the ratchet-toothed surfaces as the relative movement of shoe and plunger member takes place, and a plurality of springs acting on a recessed portion of the pawl members to urge them into engagement with the ratchet-toothed surfaces.

RUDOLPH A. GOEPFRICH.

REFERENCES CITED

The following references are of record in the file of this patent:

UNITED STATES PATENTS

| Number | Name | Date |
|---|---|---|
| 836,303 | Christensen | Nov. 20, 1906 |
| 1,072,313 | Conte | Sept. 2, 1913 |
| 1,224,997 | Ballard | May 8, 1917 |
| 2,168,646 | Goepfrich | Aug. 8, 1939 |
| 2,175,446 | Rasmussen et al. | Oct. 10, 1939 |
| 2,202,125 | Temple | May 28, 1940 |
| 2,222,858 | Ryan | Nov. 26, 1940 |